United States Patent [19]
Fung et al.

[11] Patent Number: 6,096,239
[45] Date of Patent: *Aug. 1, 2000

[54] METHOD FOR REMOVAL OF SULFUR DIOXIDE

[75] Inventors: Johnson H. Y. Fung; Raghu S. Narayan; Chien Kuei Tsai, all of Lubbock, Tex.

[73] Assignee: Milmac Operating Company, Lubbock, Tex.

[*] Notice: This patent is subject to a terminal disclaimer.

[21] Appl. No.: 09/006,572

[22] Filed: Jan. 13, 1998

Related U.S. Application Data

[62] Division of application No. 08/409,422, Mar. 24, 1995, Pat. No. 5,785,888.

[51] Int. Cl.⁷ .................................................. B01D 53/34
[52] U.S. Cl. ................ 252/192; 423/243.01; 423/243.08
[58] Field of Search .................. 423/243.01, 243.08; 252/192

[56] References Cited

U.S. PATENT DOCUMENTS

| | | | |
|---|---|---|---|
| 3,987,147 | 10/1976 | Guerrieri | 423/242 |
| 4,170,628 | 10/1979 | Kosseim et al. | 423/243 |
| 4,948,572 | 8/1990 | Egra | 423/242 |
| 5,202,103 | 4/1993 | Chang et al. | 423/242.7 |
| 5,354,545 | 10/1994 | Buisman | 423/242.1 |
| 5,693,301 | 12/1997 | Ahman | 423/243.03 |
| 5,759,505 | 6/1998 | Nolin et al. | 423/243.08 |
| 5,785,888 | 7/1998 | Tsai et al. | 252/192 |

*Primary Examiner*—Ellen M. McAvoy
*Attorney, Agent, or Firm*—Gary R. Maze; The Matthews Firm

[57] ABSTRACT

A method for removing sulfur dioxide from gas streams, comprising contacting the gas stream with an aqueous absorption liquid, transferring the liquid to another location, then mildly heating the liquid to recover the sulfur dioxide. This method allows a removal of 99.9% of the sulfur dioxide, the recovery of very pure sulfur dioxide, is resistant to upsets due to variations in the gas stream, and is cost effective.

14 Claims, 1 Drawing Sheet

METHOD FOR REMOVAL OF SULFUR DIOXIDE

This application is a divisional of application Ser. No. 08/409,422 filed Mar. 24, 1995 which application is now U.S. Pat. No. 5,785,888. This application specifically incorporates by reference the parent application Ser. No. 08/409,422 filed Mar. 24, 1995.

BACKGROUND OF THE INVENTION

The United States is one of the largest producers of sulfur in the world. Much of the sulfur is produced as a by-product from the processing of gases containing hydrogen sulfide ($H_2S$) and/or sulfur dioxide ($SO_2$), including natural gas, gas from crude oil production, and by-product gases from petroleum refining. Typically, in these and other plants constructed during the 1980's, the $H_2S$ present in the gas stream that is fed into the process ("feed gas") is converted by the process to $SO_2$, which is then converted by a catalytic process to elemental sulfur. This is normally accomplished by a number of well known processes, such as the Claus Sulfur process, the Wellman-Lord process, and the Stretford process.

In the Claus process, one-third of the $H_2S$ in the feed gas is burned with stoichiometric amounts of air to produce $SO_2$. The remaining $H_2S$ then reacts with $SO_2$ in a series of catalytic converters to form elemental sulfur. The residual $SO_2$ contained in the feed gas after treatment ("tail gas") is normally vented to the atmosphere. As emission requirements have become more stringent, these plants have had to be retrofitted to meet Clean Air Act regulations of the 1990's. This retrofitting utilizes new technology which is either a modification of the original process or an add-on process. Due to the large volume of by-product sulfur being produced, the price of sulfur has declined steadily in the last five years from nearly $100 per ton to the current price of about $40 per ton. Consequently, new technology must be increasingly effective, in terms of $SO_2$ removal efficiency, capital costs, and operating costs.

High $SO_2$ emissions in the flue-gas of coal-fired power plants have also necessitated more effective measures to control and dispose of $SO_2$. Some plants have adopted technology based on absorbing the $SO_2$ in throwaway lime or limestone solutions or slurries. The extremely corrosive nature of the solutions and slurries of these processes have made their operating costs quite prohibitive. Furthermore, disposal of the solid waste generated by these processes has caused increasing environmental concerns.

In the limestone slurry systems, the $SO_2$ is reacted with a lime or limestone slurry. The resulting slurry is then disposed of by land-farming or other means. The $SO_2$ removal efficiency of these slurry systems is increased by the addition of pH buffers.

The use of either pure or impure dibasic acids as a pH-buffering additive in limestone-slurry systems is disclosed in a number of articles, including: Chi, "Using Byproducts: A Case Study," ChemTech, p. 308, May, 1990; Chang, et al., Effect of Organic Acid Additives on $SO_2$ Absorption into $CaO/CaCO_3$ Slurries," *American Institute of Chemical Engineers Journal,* Vol. 28, No. 2, p. 261, March, 1982 (the preferred pH range according to this article is 4–6); Chang, et al., "Testing and Commercialization of Byproduct Dibasic Acids as Buffer Additives for Limestone Flue Gas Desulfurization Systems," *Journal of the Air Pollution and Control Association,* Vol. 33, No. 10, p. 955, October, 1983; and, Lee, et al., "Oxidative Degradation of Organic Acid Conjugated with Sulfite Oxidation in Flue Gas Desulfurization: Products, Kinetics, and Mechanism," *Environmental Science and Technology,* Vol. 21, No. 3, p. 266–272, 1987. The use of various dibasic acids has been shown to improve absorption rates of the limestone slurries.

For those processes that absorb the sulfur gases into a liquid first, much of the prior art utilizes an organic solvent, which chemically reacts with the $SO_2$ and $H_2S$. Examples of this type of process include Shell's "Sulferox Process", *Hydrocarbon Processing's Gas Process Handbook,* Gulf Publishing, 1992; and those disclosed in U.S. Pat. No. 3,832,454; U.S. Pat. No. 3,928,548; and U.S. Pat. No. 4,069,302.

All these processes that produce sulfur from sulfur gases are energy intensive and present hazards because of the use of organic solvents. Furthermore, most of these are not cost efficient, nor do they generally achieve essentially complete removal of the sulfur gases.

Some removal processes utilize solvent-based reactions, but then regenerate $SO_2$ instead of sulfur. The $SO_2$ released from the solvent can be dried, and liquified and sold for its chemical value. The market price for liquid $SO_2$ has remained relatively steady at nearly $225 per ton in the last five years, which is far more than the selling price of sulfur. An example of a solvent-based $SO_2$ generating technology is disclosed in U.S. Pat. No. 4,885,146. All solvent-based systems suffer from high expense and the dangers normally associated with use of solvents.

The produced liquid $SO_2$ has a variety of industrial applications. Liquid $SO_2$ has been known as a good solvent for the purification of lubricating oils and for increasing oil viscosity and paraffinity. It has also been used as a solubilizing agent of phosphates and dyes, as raw material to produce sulfuric acid and sulfolane, as an excellent polymer solvent, and for sulfonation with $SO_2$. Liquid $SO_2$ is usually manufactured by the sulfur-burning process and through recovery from metallurgical sources. Its availability from such sources, however, is subject to fluctuations in economic conditions and the state of labor relations in the metallurgy industry. Recovery of liquid $SO_2$ from waste product of acid gas removal processes can certainly be a supplemental source to help stabilize the liquid $SO_2$ supply to the industry.

To avoid the problems associated with solvent-based processes, some processes are aqueous-based. Such absorption liquids contain various components, mostly to enhance the absorption abilities of the liquid. For instance, numerous studies have shown that $SO_2$ absorption is enhanced at certain pH ranges, though there are disagreements in the literature as to exactly what is the optimum pH range. Regardless, as $SO_2$ is absorbed, the pH of the solution tends to be more acidic. Therefore, a buffering agent must be added to keep the pH in the proper range. U.S. Pat. No. 4,965,062 is an example of an aqueous-based system, and discloses a method for reacting $H_2S$ to elemental sulfur. This aqueous-based process uses sulfite ions and an acetic acid—acid salt buffering system. This system requires $H_2S$ recycle to properly work.

Various aqueous processes using a sodium citrate absorption solution have been in use since the early 1970's. Sodium citrate is a popular absorption product because it tends to buffer the absorption solution to keep it in the pH range of 3.5 to 5.5, where maximum absorption and desorption of $SO_2$ can occur. The absorbed $SO_2$ can either be reacted to produce elemental sulfur, or recovered unaltered. See Information Circulars 7774, 8540, 8793, 8806, and 8819, Bureau of Mines, United States Department of the Interior. Other similar processes that react the $SO_2$ to elemental sulfur are disclosed in U.S. Pat. No. 4,048,293; U.S. Pat. No. 4,519,994; U.S. Pat. No. 3,983,225; and, U.S. Pat. No. 4,450,145.

Some processes concentrate and recover the $SO_2$ unaltered, instead of reacting it to elemental sulfur. The recovered $SO_2$ can then be used as feed for another process or liquified and sold, as discussed above. The citrate process discussed above can be used for absorption and desorption of $SO_2$, as for example disclosed in U.S. Pat. No. 3,886,069.

Other similar aqueous processes are disclosed in the following; Bengtsson, "The Flakt-Boliden $SO_2$ Recovery Process", *Chemistry in Canada,* January, 1981; *Aqueous Absorbents for Stack Gas Desulfurization by Absorption/ Stripping,* Electric Power Research Institute, CS-3185, July 1983; "The Recovery of Sulfur from Smelter Gases," *Journal of the Society of Chemical Industry,* Vol. 56, p. 139, May, 1937; U.S. Pat. No. 4,181,506; "Union Carbide claims 99t Effectiveness for Flue Gas Scrubber", Vol. 89, No. 46, Oil and Gas Journal, Nov. 18, 1991; *Electric Power Research Institute Report,* CS-3228, Final Report, October 1983; Erga, "A New Regenerable Process for the Recovery of $SO_2$", *Chemical Engineering Technology,* Vol. 11, p. 402–407, 1988; Erga, "$SO_2$ Recovery by Means of Adipic Acid Buffers", *Industrial Chemical Engineering Fundamentals,* Vol. 25, p. 692–695, 1986; Goar, "Today's Sulfur Recovery Processes", *Hydrocarbon Processing,* Vol. 47, No. 9, p. 249–252, 1968; Kumazawa, "Simultaneous Removal of NO and $SO_2$ by Absorption into Aqueous Mixed Solutions," *American Institute of Chemical Engineers Journal,* Vol. 34, No. 7, pp. 1215–1220; Johnstone, et al., "Recovery of Sulfur Dioxide from Waste Gases", *Industrial and Engineering Chemistry,* p. 101–109, January, 1938.

All of the processes for $SO_2$ removal discussed above, whether aqueous or non-aqueous, suffer from some related problems. First, most of these processes cannot reduce the amount of $SO_2$ in the effluent gas stream to below 100 ppm. One key reason for this lack of efficiency is the lack of sufficient solubility of $SO_2$ in the absorption liquid. Another reason is the lack of efficient contacting between the $SO_2$ and the absorption liquid. Considering current and near-future EPA regulations on emissions of $SO_2$, reduction of the amount of $SO_2$ remaining in the stream is a necessity and reduction to near zero may soon be required.

Second, almost all of these systems are not cost effective and in fact they lose money. That is, they cost more to operate than is made by selling the recovered sulfur or $SO_2$. These systems are expensive to operate because of high energy consumption, as most require elevated temperatures. Also, the systems that absorb and regenerate $SO_2$ tend to rapidly build up byproducts in the absorption liquid and these byproducts must be removed to maintain the efficiency of the processes. Also, many of the components used in the absorption liquid are relatively expensive, hazardous to use, or corrosive, and thus require more expensive handling equipment.

Third, many of these processes do not tolerate variations in the incoming feed stream very well, and are easily upset.

A more cost efficient $SO_2$ removal process developed to date is the Aquaclaus process. In the Aquaclaus process, the $SO_2$ is absorbed in an aqueous solution containing phosphoric acid ($H_3PO_4$) and sodium carbonate ($Na_2CO_3$), with the active chemical species being sodium phosphate. The absorbed $SO_2$ is reacted with $H_2S$ to generate elemental sulfur. The sulfur is separated from the absorption liquid, and the absorption liquid is recycled for use again. For a basic discussion of this process, see Hayford, "Process Cleans Tail Gases," *Hydrocarbon Processing,* Vol. 52, No. 10, p. 95–96, 1973. One of the desirable aspects of this process is its resistance to upsets due to variations in the feed stream, as well as its high efficiency of removal.

However, what is needed in the marketplace and what is embodied in the present invention is a $SO_2$ removal process that is profitable to operate and removes virtually all the $SO_2$ from the feed stream in one pass, regardless of variations in the feed stream.

SUMMARY OF THE INVENTION

A proposed solution to the problems identified above, is to use a modified Aquaclaus process that removes the $SO_2$ by contacting the tail-gas or power plant flue-gas with a lean physical solvent in an absorber. The effluent from such a process will contain less than 100 parts per million by volume (ppmv) $SO_2$, and can be vented to the atmosphere. Preferably the effluent will have no $SO_2$ remaining. The solvent, rich in $SO_2$ from the absorber, is then sent to a regenerator where the absorbed $SO_2$ is released by mild heating. The lean solvent is then recycled for reuse.

The invention comprises a new synergistic blend to create a superior absorption liquid. This mixture comprises a polyprotic inorganic acid, an inorganic base, and an additive that further increases the buffering capacity of the absorption liquid, thereby enhancing the solubility of $SO_2$ in said absorption solution, while maintaining effective $SO_2$ regeneration. Said polyprotic inorganic acid is preferably phosphoric acid ($H_3PO_4$). Said inorganic base is comprised of one of the following: (1) carbonates of an alkali metal, such as sodium carbonate ($Na_2CO_3$), and/or potassium carbonate ($K_2CO_3$); (2) hydroxides of an alkali metal, such as sodium hydroxide (NaOH), and/or potassium hydroxide (KOH); or (3) a mixture of the proceeding two inorganic bases. This additive is soluble or at least miscible in aqueous solution. This additive is comprised of one of the following: (1) a monoprotic organic acid, such as acetic acid ($CH_3CO_2H$), formic acid ($HCO_2H$), lactic acid ($CH_3CH(OH)CO_2H$), or propionic acid ($C_2H_5CO_2H$); (2) a polyprotic organic acid such as adipic acid ($HO_2C(CH_2)_4CO_2H$), tartaric acid ($HO_2CH(OH)CH(OH)CO_2H$), isophthalic acid ($C_6H_4$—1, 3—$(CO_2H)_2$), or citric acid ($HO_2CCH_2C(OH)$ $(CO_2H)$ $CH_2CO_2H$); an organic base buffer such as ethylene glycol ($HOCH_2CH_2OH$); (4) a mixture of any of the proceeding three organic additives; (5) a polyprotic inorganic acid such as boric acid ($H_3BO_3$); or (6) a mixture of the preceeding five organic and/or inorganic additives. This liquid has superior absorption, desorption and buffering properties, is relatively safe and inexpensive to use, is resistant to variations in flow rates, has physical characteristics that make the solution easy to work with, and can be adapted for use with most current equipment and systems.

DETAILED DESCRIPTION OF THE INVENTION

Figure 1:
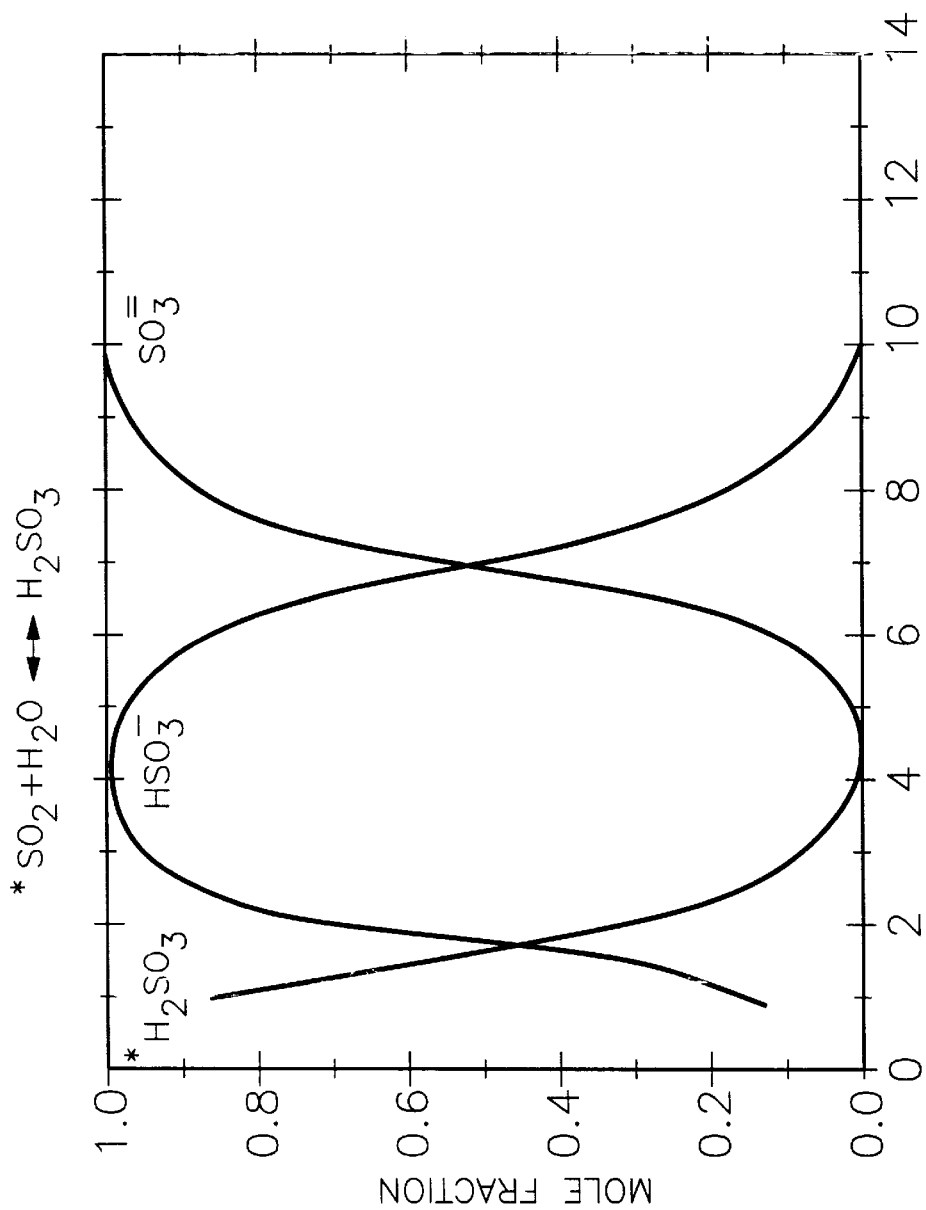
FIG. 1 is a graph showing bisulfite-sulfite distribution as a function of pH.

The proposed process is an improved physical absorption process, using synergistically blended buffered aqueous solvents, similar to that described in the Aquaclaus process developed by Stauffer Chemical Company, and disclosed in U.S. Pat. No. 4,181,506. The basic ingredients of the inventive absorption liquid are dilute amount of phosphoric acid ($H_3PO_4$) and sodium carbonate ($Na_2CO_3$), which are chemically inert to the constituents of the feed gas under the operating conditions. A significant and innovative concept of the process is the use of an additive which acts synergistically as a buffering agent and is miscible in the aqueous solvent system. Prescence of such an additive dramatically enhance the solubility of $SO_2$. Additionally, the boiling point of the solvent is elevated, thus reducing solvent loss during regeneration.

Solubility of $SO_2$ in the absorption liquid is one of the key parameters thar determines the ability and efficiency of any particular process for $SO_2$ removal. The invention utilizes a novel absorption liquid. The first component of the absorption liquid is a polyprotic acid, e.g., $H_3PO_4$. Phosphoric acid is polyprotic, i.e., it has more than one OH group and therefore several H+(proton) groups for ionization. It acts as an excellent buffer, having a higher capacity than common monoprotic buffers to resist changes to the pH of the solvent. Typical acidic components of the gas, i.e., $SO_2$, are absorbed to form a physical solution, which can be regenerated by disruption using direct or indirect heating to release the dissolved $SO_2$.

The fundamental reaction mechanism of $SO_2$ absorption in aqueous phase is $SO_2$ hydrolysis. When $SO_2$ is dissolved in water, a portion of it ionizes according to the following reactions:

$$SO_2(g) \leftrightarrow SO_2(aq) \tag{1}$$

$$SO_2(aq) \leftrightarrow HSO_3^- + H^+ \tag{2}$$

$$HSO_3^- \leftrightarrow SO_3^{2-} + H^+ \tag{3}$$

Equilibrium conditions for reactions (1) to (3), i.e., bisulfate($HSO_3^-$)-sulfite($SO_3^{2-}$) distribution, are defined by the curves in FIG. 1. However, due to its thermodynamic limitation, the formation of $HSO_3^-$ and $SO_3^{2-}$ from $SO_2$ in water are suppressed by increasing acidity, driving the reactions to the left and thereby reducing the solubility of $SO_2$ in the aqueous phase, and thereby the resulting reaction rate.

As shown in FIG. 1, the hydrolysis capacity of $SO_2$ in aqueous phase is best where the pH is within the range of 2 to 7. The desirable properties of a buffered solution for $SO_2$ removal includes: (1) a maximum buffer capacity near a pH range where both absorption and desorption rates are effective; and, (2) an additional significant buffer capacity contributed by the addition of a small amount of a different buffer which substantially increases $SO_2$ uptake. Using $H_3PO_4$ acid buffer in a dilute amount, the monohydrogen and tribasic forms of the phosphate buffer react with the hydrogen ions to keep the solution pH in the proper range and thus achieve high $SO_2$ loading (i.e., solubility):

$$HPO_4^{2-} + H^+ \leftrightarrow H_2PO_4^- \tag{4}$$

$$H_2PO_4^- + H^+ \leftrightarrow H_3PO_4 \tag{5}$$

Such absorption potential by the phosphate buffer has been shown in several U.S. patents, including U.S. Pat. Nos. 3,911,093, 4,450,145, and 4,519,994. Our laboratory testing indicates that a range of molarity of phosphoric acid may be used, preferably less than 2.0 M, with 1.5 M being optimal.

Small amounts of sulfate ($SO_4^{2-}$) may also be formed in the presence of oxygen according to the following reaction:

$$HSO_3^- + \tfrac{1}{2}O_2 \rightarrow SO_4^{2-} + H^+ \tag{6}$$

The sulfate radical is the primary free radical responsible for solvent degradation. Oxidation reaction (6), however, is very limited and hence does not have a significant effect on the performance of the process. To further reduce this effect, an inorganic base such as $Na_2CO_3$ is added to the absorption liquid. This base reacts with the sulfate radicals to limit solvent degradation. In fact, laboratory testing has shown that use of the disclosed absorption liquid greatly reduced the rate of build up of sulfate and helps increase $SO_2$ uptake. The preferred ratio of Na+ to $PO_4^{2-}$ is from 1.5 to 2.

After a period of time, accumulated sulfate must be purged from the system. This is done by cooling a slipstream of lean solution to precipitate sodium sulfate decahydrate ($Na_2SO_4 \bullet 10H_2O$), also known as Glauber's salt.

$$Na_2CO_3 + SO_4^{2-} + 2H^+ + 9H_2O \rightarrow CO_{2(g)} + Na_2SO_4 \bullet 10H_2O_{(s)} \tag{7}$$

The sulfate crystals are easily formed and removed from the solution by a screen.

A third component in the absorption liquid is a synergistic additive. For example, dibasic organic adipic acid, ($H_2Ad$, i.e., $COOH(CH_2)_4COOH$), is also a polyprotic acid buffer. Similar buffer reactions take place as follows:

$$Ad^{2-} + H^+ \leftrightarrow Had^- \tag{8}$$

$$Had^- + H^+ \leftrightarrow H_2Ad \tag{9}$$

Its maximum buffer capacity lies in the range of most effective $SO_2$ hydrolysis. $H_2Ad$ was selected because of its solubility in water, low volatility, stability, low toxicity, low cost, availability, and potentially lower degradation rate. Laboratory testing indicates that an additional 1000 ppm of H2Ad is beneficial.

Interestingly, the use of a small amount of adipic acid blended with the phosphoric acid yields radically better absorption rates than either buffer alone.

Another choice of additive is dibasic organic base buffer, such as ethylene glycol. Its buffer reactions are identical to that of $H_2Ad$. It was selected for its solubility in water, low volatility, availability, and anti-oxidation ability that is normally present in the commercial brands. Testing indicates an additional 1000 ppm of this product is also beneficial.

Regeneration usually requires a solvent of low volatility. The inventive absorption liquid has a distinct advantage over 13 prior art absorption liquids, as its components are non-volatile. Desorption is accomplished by either lowering the vapor pressure above the absorption liquid (as with a vacuum), or by raising the temperature of the absorption liquid.

An additional benefit of the disclosed absorption liquid is that it has a higher boiling point than other absorption liquids, and therefore there occurs less loss of solvent during regeneration of the $SO_2$. Furthermore, with less heat being utilized to vaporize solvent, a higher percentage of the heat applied to the $SO_2$-rich liquid is used to vaporize the $SO_2$. As heat is a cost in most applications, the use of the inventive method results in decreased operating costs.

Prior to liquefaction of the $SO_2$ that is regenerated, it needs to be dehydrated to less than 1 ppmv water vapor. This is necessary to prevent hydrate formation and corrosion from condensed water. For this purpose alone, the regeneration process should be conducted at slightly more than one atmosphere pressure, e.g., 40 KPa. Under these conditions, there is less azeotrope of water vapor, so the production of scale in the dehydration equipment can be reduced without reducing the equipment's capacity. Furthermore, operating at slightly elevated pressure will also reduce the loss of solvent during solvent regeneration.

The entire disclosed process is well-integrated, self-balancing, and to some extent self-sufficient, as the steam requirement for the stripping process can be met by the energy recovered from both the waste heat boiler and the feed gas adiabatic cooler. In addition, typical heat requirements in the stripper are small for physical solvents compared to chemical solvents because with chemical solvents more energy is needed to break the stable chemical bonds between the acid gas component and the solvent. Furthermore, the use of additives creates the potential for obtaining a substantial reduction in steam consumption which does not exist in the original Aquaclaus Process. Steam consumption can be reduced in the invention because, as $SO_2$ removal efficiency increases, the liquid circulation rate can be reduced.

Therefore, as long as the operating conditions such as the solvent circulation rate, temperature, solvent concentration and pH can be maintained at a relatively constant level, this process is very tolerant. The proposed process is virtually insensitive to variation in feed rate and composition such that upsets and variations in upstream processing have little effect on its performance. Small amounts of impurities, such as $CO_2$ and $CS_2$, can also be tolerated. The disclosed absorbing solution has proven to be stable and resistant to poisoning, and no expensive catalyst is required.

Tests described by other similar research and in several U.S. patents in the early eighties restated the advantages of the absorption-desorption concept as having relatively low capital investment requirements, operating simplicity and flexibility with high $SO_2$ removal efficiency, and the resulting emission of very clean vent gas (i.e., less than 100 ppmv $SO_2$). Due to a high level of process integration, process effluents, which normally require treatment to be in compliance with local environmental regulations, have either no or very minimal levels of unacceptable products. As a result, equipment and operating costs are extremely competitive with conventional processes because of the moderate operating conditions. The following examples illustrate the present invention in more detail.

EXAMPLE 1

This example describes the general procedure used to generate the data in the later examples. A solution of 8.25% $Na_2CO_3$ by weight (wt) was prepared by dissolving 89.8790 g of $Na_2CO_3$ into one liter of water. One hundred milliliters (ml) of the absorption solution with a $Na/PO_4$ ratio of 1.57 and 1.0 molar $H_3PO_4$ was prepared by mixing 7.42 ml of 85 wt % $H_3PO_4$ solution and 92.58 ml of 8.25 wt % $Na_2CO_3$ solution. Fifty ml of the absorption solution was placed in a standard gas bubbler. A pure $SO_2$ gas stream was bubbled through the absorption solution in the gas bubbler and exited to the vent hood. The gas bubbler with the absorption solution was weighed before and periodically during the test until there was no more weight gain. The result was then calculated to give the maximum $SO_2$ solubility in grammole of $SO_2$ per liter of absorption solution (gmol/L). The following tables illustrate the effect of different $H_3PO_4$ concentrations and $Na/PO_4$ ratios in the absorption solution at 21.5° C. using pure $SO_2$.

| $H_2PO_4$ (M) at $Na/PO_4$ ratio of 1.57 | $SO_2$ (gmoVL) |
|---|---|
| 0.135 | 1.480 |
| 0.81 | 1.933 |
| 1.0 | 1.970 |
| 1.5 | 2.201 |
| 3.0 | 2.314 |

| $Na/PO_4$ ratio | 1.0 $MH_3PO_4$ | 1.5M $H_3PO_4$ |
|---|---|---|
| 0 | 1.302 | 1.186 |
| 1.0 | 1.346 | 1.639 |
| 1.57 | 1.970 | 2.201 |
| 1.97 | 2.276 | 2.195 |
| 2.67 | 2.398 | 2.407 |
| 4.0 | 2.932 | 3.647 |

EXAMPLE 2

Using the same procedure described in Example 1, an absorption solution ($Na/PO_4$ ratio of 1.57 and 1.0 molar $H_3PO_4$) with 1000 ppmv $H_2Ad$ as an additive for absorbing $SO_2$. The effect of this additive on $SO_2$ solubility (gmol/L) at various $SO_2$ gas concentrations at 21.5° C. is illustrated in the following table:

| $SO_2$ inlet concentration (%) | With no $H_2Ad$ | With 1000 ppmv $H_2Ad$ |
|---|---|---|
| 3 | 0.115 | 0.184 |
| 100 | 1.028 | 1.416 |

EXAMPLE 3

A series of runs were made employing the method described. in Example 1 in which the temperature of the absorption liquid was varied in order to study the effect of this parameter on $SO_2$ solubility, using pure $SO_2$. A 50 ml flask with 25ml absorption solution submerged in a water bath to maintain constant temperature was used for this experiment. The results for an absorption solution with a $Na/PO_4$ ratio of 1.57 and using 1.0 molar $PO_4$, are illustrated in the following table:

| Temperature (C.) | $SO_2$ (gmol/L) |
|---|---|
| 21.5 | 1.537 |
| 30 | 1.360 |
| 40 | 0.970 |
| 50 | 0.821 |
| 60 | 0.365 |

EXAMPLE 4

In this example, the conditions are identical to those used in Example 3. The effect of temperature on $SO_2$ solubility in the presence of 1000 ppmv $H_2Ad$ as an additive is illustrated in the following table:

| Temperature (C.) | $SO_2$ (gmol/L) |
|---|---|
| 21.5 | 1.628 |
| 30 | 1.456 |

-continued

| Temperature (C.) | $SO_2$ (gmol/L) |
|---|---|
| 40 | 1.134 |
| 50 | 0.934 |
| 60 | 0.886 |

EXAMPLE 5

In this example, the conditions are identical to those used in Example 2. The effect of different additive concentrations (the additive here being $H_2Ad$) on $SO_2$ solubility using pure $SO_2$ at 21.5° C. is illustrated in the following table:

| $H_2Ad$ (M) | $SO_2$ (gmol/L) |
|---|---|
| 0 | 1.029 |
| 0.005 | 1.193 |
| 0.01 | 1.412 |
| 0.05 | 1.730 |
| 0.1 | 2.008 |
| 0.2 | 1.876 |

EXAMPLE 6

In this example, the conditions are identical to those used in Example 2. Eight different additives having functionality similar to H2Ad, were used in the absorption solution with a $Na/PO_4$ ratio of 1.57 and using 1.0 molar $PO_4^{2-}$. The results at 21.5° C. using pure $SO_2$ are illustrated in the following table:

| Additive, each 1000 ppmv | $SO_2$ (gmol) |
|---|---|
| Propionic Acid | 2.070 |
| $H_2Ad$ | 1.973 |
| Tartaric Acid | 1.842 |
| Isophthalic Acid | 1.917 |
| Citric Acid | 1.961 |
| Ethylene Glycol | 1.958 |
| Boric Acid | 1.901 |
| $H_2Ad$ and Ethylene Glycol | 2.223 |

EXAMPLE 7

In this example, the reaction apparatus is identical to those used in Example 3. Absorption solutions with a base/$PO_4$ ratio of 1.57 and using 1.0 molar $PO_4^{2-}$, employing different inorganic bases were used for absorbing $SO_2$. The results on $SO_2$ solubility with the presence of $H_2Ad$ as an additive at 21.5° C. using pure $SO_2$ are illustrated in the following table:

| $H_2Ad$ (ppmv) | $Na_2CO_3$ | $K_2CO_3$ | NaOH |
|---|---|---|---|
| 0 | 1.537 | 1.471 | 1.808 |
| 1000 | 1.628 | 1.833 | 1.697 |

EXAMPLE 8

This example illustrates the regeneration ability of the absorption solution, in that the the dissolved $SO_2$ can be released from the absorption solution using mild heating. A stripping apparatus employing a heated 500ml flask with a water-cooled reflex condenser was used. Fifty ml of $SO_2$ loaded absorption solution with a $Na/PO_4$ ratio of 1.57, and using 1.0 molar $PO_4^{2-}$ with different additives was placed in the flask and heated to its boiling point. The flask was weighed before and after the stripping test. The results are illustrated in the following table:

| Additive, each 1000 ppmv | % $SO_2$ released |
|---|---|
| No Additive | 95 |
| Propionic Acid | 60 |
| $H_2Ad$ | 65 |
| Isophthalic Acid | 60 |
| Citric Acid | 37 |
| Ethylene Glycol | 30 |
| Boric Acid | 35 |

EXAMPLE 9

This example demonstrates the solubility of the absorption solution compared to water at 40° C. The solution was prepared the same way as described in Example 1, and this solution had a $Na/PO_4$ ratio of 1.97, $PO_4^{2-}$ of 1.5 molarity. A conventional packed tower with berl saddles was used as the contacting device.

| Solvents | Gas Rate (ml/min) | Liquid Rate (ml/min) | Inlet SO2 Concentration (ppm) | Outlet SO2 Concentration (ppm) |
|---|---|---|---|---|
| Absorption Solution | 57.51 | 41.92 | 40.56 | 55.28 |
| Water | 57.74 | 43.27 | 39.34 | 166.51 |

EXAMPLE 10

In this example, the conditions are identical to those used in Example 2. A mixture of additives having similar function as $H_2Ad$, were used in the absorption solution with $Na/PO_4$ ratio of 1.57 and 1.0 molar $PO_4^{2-}$. The results at 21.5° C. using pure $SO_2$ are illustrated in the following table:

| Additives, each 1000 ppmv | $SO_2$ (gmol/L) |
|---|---|
| Citric Acid, Boric Acid | 1.909 |
| Ethylene Glycol, Boric Acid | 2.018 |
| Ethylene Glycol, Citric Acid | 1.862 |
| Ethylene Glycol, Citric Acid, Boric Acid | 1.983 |
| H2Ad, Boric Acid | 2.086 |
| H2Ad, Citric Acid | 1.892 |
| H2Ad, Citric Acid, Boric Acid | 1.951 |
| H2Ad, Ethylene Glycol | 2.017 |
| H2Ad, Ethylene Glycol, Boric Acid | 2.046 |
| H2Ad, Ethylene Glycol, Citric Acid | 1.919 |
| H2Ad, Ethylene Glycol, Citric Acid, Boric Acid | 2.122 |

It will be understood by those in the art that various modifications and changes could be made to the method and absorption liquid described above, and these modifications and change would not depart from the spirit and scope of the invention.

We claim:

1. A method of removing sulfur dioxide from a gas stream, comprising;

contacting said sulfur dioxide through a contacting means with an absorption liquid at a first location, said absorption liquid absorbing said sulfur dioxide, said absorption liquid comprising;

water;

a polyprotic inorganic acid, to act as a buffering agent, to buffer the pH of said absorption liquid within the range of 2 to 7;

an inorganic base, chosen from the group consisting of: carbonates or hydroxides with alkali metal, to aid in the removal of unwanted side products, and to enhance sulfur dioxide solubility; and, an additive, said additive chosen to synergistically enhance the absorption and solubility of said sulfur dioxide and assist in buffering the pH, while still maintaining effective sulfur dioxide regeneration, said additive being chosen from one or more of the group consisting essentially of: a monoprotic organic acid; a polyprotic organic acid; an organic base buffer; a mixture of any of the preceeding three organic additives; a polyprotic inorganic acid; and a mixture of the preceeding five additives;

transferring said absorption liquid containing said sulfur dioxide to a second location; and, desorbing said sulfur dioxide by altering the differences between the vapor pressures of said sulfur dioxide in said liquid and the gas phase above the surface of said absorption liquid, such that said vapor pressure of said sulfur dioxide in said absorption liquid is greater than said vapor pressure of said gas above said surface of said absorption liquid.

2. The method of claim 1, wherein said polyprotic inorganic acid is phosphoric acid.

3. The method of claim 2, wherein said phosphoric acid has a molarity less than or equal to 2.0 M in said absorption liquid.

4. The method of claim 3, wherein said phosphoric acid has a molarity of 1.0 M to 1.5 M in said absorption liquid.

5. The method of claim 1, wherein said inorganic base is sodium carbonate.

6. The method of claim 5, wherein the concentration ratio of said sodium to said phosphate is less than 3:1 in said absorption liquid.

7. The method of claim 6, wherein said concentration ratio of said sodium to said phosphate is between 1.5:1 and 2:1 in said absorption liquid.

8. The method of claim 1, wherein said additive is adipic acid.

9. The method of claim 8, wherein said adipic acid has molarity equal to or less than 0.2 M in said absorption liquid.

10. The method of claim 9, wherein said adipic acid constitutes 1000 ppmv in said absorption liquid.

11. The method of claim 1, wherein said alteration of vapor pressures is accomplished by heating said absorption liquid by use of a reboiler or steam stripping.

12. The method of claim 1, wherein said desorbing is conducted at a pressure slightly in excess of 1 atmosphere.

13. The method of claim 1, wherein said polyprotic inorganic acid is phosphoric acid, said phosphoric acid having a molarity of 1.0 M to 1.5 M in said absorption liquid, wherein said organic base is sodium carbonate, wherein the concentration ratio of said sodium to said phosphate is between 1.5:1 and 2:1, wherein said additive is adipic acid, said adipic acid constituting about 1000 ppmv in said absorption liquid, and wherein said altering of vapor pressures is accomplished by heating said absorption liquid to a temperature of between 200° F. and 240° F., and at a pressure of greater than 1 atmosphere.

14. The Method of claim 1, wherein said polyprotic inorganic acid is phosphoric acid, said phosphoric acid having molarity of 1.0 M to 1.5 M in said absorption liquid, wherein said inorganic base is sodium carbonate, the concentration ration of said sodium to said phosphate being between 1.5:1 and 2:1, and wherein said additive is adipic acid, said adipic acid constituting 1000 ppmv in said absorption liquid.

* * * * *